No. 881,562. PATENTED MAR. 10, 1908.
L. J. ELLIS.
COOKING OR CULINARY UTENSIL.
APPLICATION FILED MAY 29, 1907.
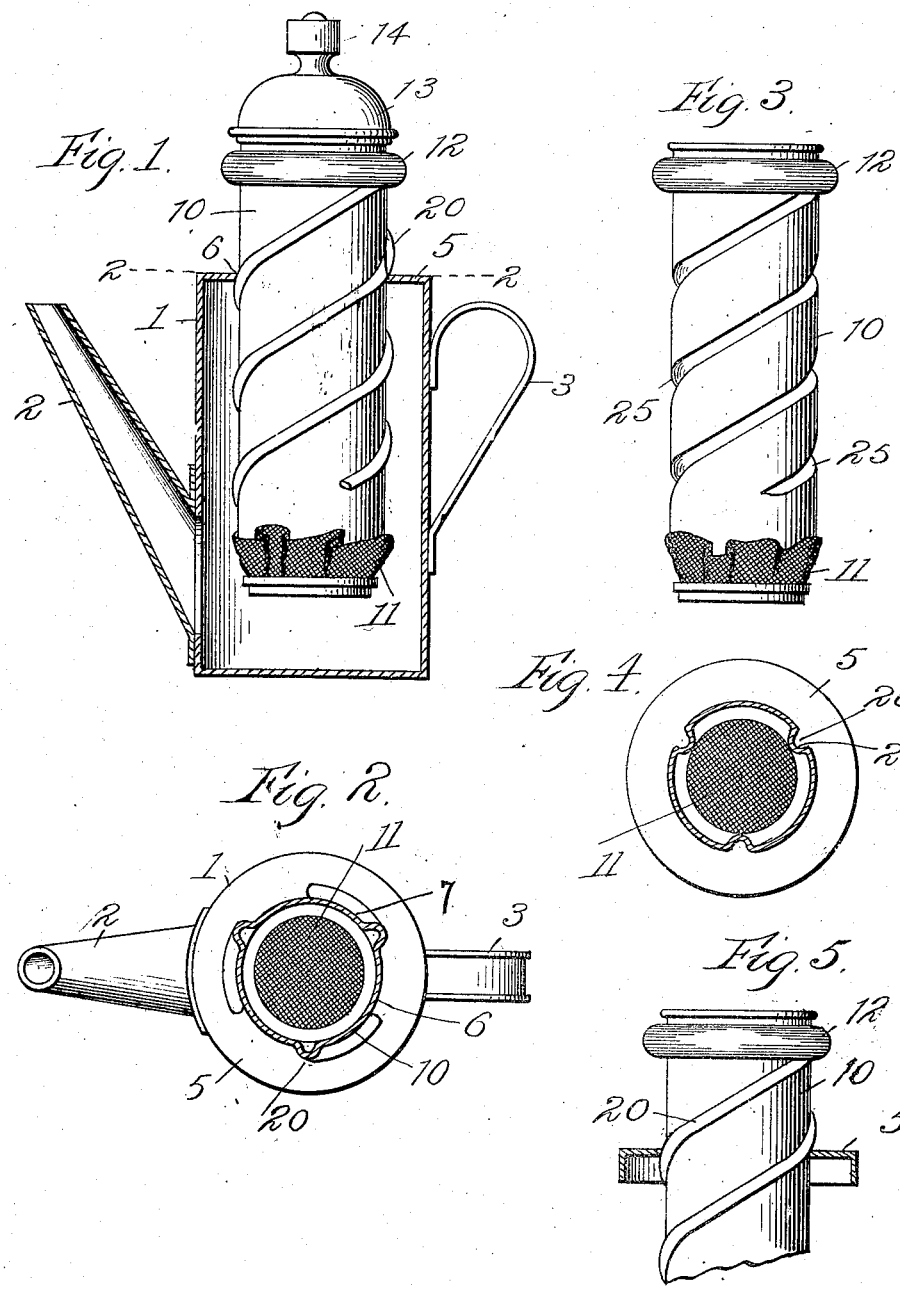
Witnesses:
Leroy J. Ellis, Inventor,
By his Attorneys

UNITED STATES PATENT OFFICE.

LEROY J. ELLIS, OF PLAINFIELD, NEW JERSEY.

COOKING OR CULINARY UTENSIL.

No. 881,562.

Specification of Letters Patent.

Patented March 10, 1908.

Application filed May 29, 1907. Serial No. 376,379.

*To all whom it may concern:*

Be it known that I, LEROY J. ELLIS, a citizen of the United States, and resident of Plainfield, in the county of Union and State of New Jersey, have invented a new and useful Improvement in Cooking or Culinary Utensils, of which the following is a specification.

The subject of this invention is a culinary utensil comprising a containing vessel supported within an annular plate or like sustaining device, by means of oblique ribs on the outside of the said vessel so that a rotary movement of the vessel will shift it up or down and cause it to be sustained automatically at any height to which it may be set.

The annular sustaining device commonly constitutes the top plate of an outer receptacle in which the containing vessel may be adjusted up or down, but such outer receptacle, in its entirety, is not essential to the mechanical operation of vertical adjustment of the containing vessel and supporting it at variable height. In this type of utensils the outer receptacle is usually formed with a bottom, adapting it to contain water, but said outer receptacle is sometimes made without a bottom to act as a flue or jacket for confining heat around the inner vessel. The inner vessel may be formed with a tight bottom, as in the case of steam cookers or when used with a bottomless outer receptacle, or the inner vessel may be provided with a percolator-bottom, either fixed or removable, adapting the vessel particularly for brewing coffee, in which case the outer receptacle, (or coffee pot) must of course have a bottom.

My improved cooking or culinary utensil in its complete form, thus comprises a suitable outer receptacle, (with or without a bottom) having an open mouth, and an inner vessel fitting snugly within the open mouth of the outer receptacle, and means adapting the inner vessel to be readily adjusted in height within the outer receptacle and automatically supported at any height at which it may be set. The inner vessel is preferably made of glass or porcelain, but it may be conveniently formed of tin or other material commonly used in the manufacture of cooking utensils.

Under the improved construction which is the subject of my present application the means of guiding the inner vessel in its vertical movement within the outer receptacle and supporting it at any height of adjustment, consist of ribs or grooves on one member inclined from a vertical position and preferably spiral in form, and counterpart recesses or projections on the other member, engaging so that by a slight rotary movement of the hand the inner vessel may be moved up or down and automatically guided in such vertical movement and will rest supported at any height at which it is set, without special manipulation with the aid of vision, as was necessary with interlocking horizonal projections or horizontal lugs engaging with a notched horizontal flange heretofore in use.

In the accompanying drawing Figure 1 is a sectional elevation, illustrating my improved cooking or culinary utensil in the form of a coffee pot, showing an outer receptacle with a notched annular top and the inner vessel with external spiral ribs formed or applied thereon and engaging with the notched annular top of the outer receptacle. Fig. 2 is a horizontal section on the line 2—2, Fig. 1, showing the outer receptacle in plan view. Fig. 3 is an elevation showing a modification in which the inner vessel is formed with spiral grooves instead of projecting ribs. Fig. 4 shows a horizontal section of the inner vessel, and a plan of the annular supporting plate with ears projecting inward from the annular plate, or top of the outer receptacle so as to engage the external spiral grooves on the inner vessel. Fig. 5 is a diagrammatic view, showing a fragment of the containing vessel in elevation and a flanged annular supporting plate in vertical section.

I have illustrated and will now describe my invention in its application to a coffee pot; but I would have it understood that I do not intend to limit my invention to this particular use, but intend to cover it as a cooking or culinary utensil for any purpose to which the invention may be applicable. With this explanation it will be clear that it is immaterial to the nature and scope of my invention whether or not the annular supporting plate forms the top of an outer receptacle as shown in Fig. 1, or what form of outer receptacle is used, or whether it is made with or without a bottom or whether the inner vessel is provided with a percolator-bottom or a closed bottom, the main feature of my invention relating to means for holding the inner vessel in the desired position of adjustment within the annular supporting plate or outer receptacle.

1 is a receptacle, shown in the form of a coffee pot, with a spout 2, and a handle 3. The spout 2 may be omitted, and the form of handle 3 may be changed when the receptacle is designed to contain water for other cooking purposes. The bottom of receptacle 1 may also be omitted when it is to serve only as a supporting casing for confining the heat around the inner vessel hereinafter referred to. The outer receptacle 1 is formed at its top with an inturned flange or annular supporting plate 5, forming the wall of the open mouth 6. This annular top or plate 5 is notched or recessed at intervals, as shown at 7 for the purpose which will presently appear.

10 is the inner vessel which is preferably formed of glass or porcelain, but may be formed of tin or other material usually employed in the manufacture of cooking utensils. The lower end of the inner vessel 10 is covered with a removable percolator gauze or cloth 11 for the purpose which is well understood. For steam cooking, and for use with the open bottom receptacle the lower end of vessel 10 may have an imperforate bottom. Adjacent to the top upon the outer surface of the inner vessel 10 is secured a ring of wood or other non-heat-conducting material 12, which forms a handle by which the inner vessel may be handled and adjusted. Other forms of handles may be used if preferred. The top of the inner vessel 10 is tightly closed by a snugly fitting cover 13 of ordinary construction, provided with a customary knob or handle 14.

In order to provide for the ready adjustment of the inner vessel 10 at any height in the annular supporting plate 5 or outer receptacle 1 and adapt it to rest, automatically supported, in any position to which it is moved, I form or otherwise rigidly secure upon the outer surface of the inner vessel a series of inclined ribs 20 as illustrated in Figs. 1 and 2, or grooves 25 in lieu thereof, as illustrated in Figs. 3 and 4.

In the illustration shown in Figs. 1 and 2, the spiral ribs or flanges 20, preferably three in number, engage and slide easily in the radial notches or recesses 7 in the annular supporting plate, forming the top or flange 5 of the outer receptacle 1, resting in said annular top or plate with sufficient friction to support the inner vessel at any height to which it may be adjusted but permitting it to be readily moved up or down by a rotary movement of the inner vessel either to the right or left (according to whether it is to be lowered or raised within the annular plate or outer receptacle) either with or without a slight vertical pressure of the hand. In thus adjusting the inner vessel up or down the spiral ribs act as threads of a screw and serve as guides so that any necessity of observation with the eye, in setting the inner vessel in adjusted and supported position, is obviated.

In the modification shown in Figures 3 and 4, the same effect is produced by spiral grooves 25 formed on the inner vessel 10, engaging with tongues or projections 26 extending inward from the margin of the annular supporting plate 5.

The utility of my invention will be clearly understood without detail explanation. In brewing coffee, the ground coffee is, of course, placed within the vessel 10 upon the percolator cloth or gauze 11, and boiling water poured into the top of the vessel 10. In starting the operation, the vessel 10 may be allowed to remain in its lowermost position so as to retain the coffee submerged in the boiling water during the few moments of boiling or brewing after which the vessel 10 is preferably raised in the receptacle and supported above the liquid to drain, thereby avoiding the deleterious effect of allowing the coffee grounds to remain too long in the liquor. Or, by supporting the vessel 10 at a sufficient distance above the bottom of the receptacle 1, with the ground coffee in the vessel 10, what is known as "drip coffee" can be made by pouring the boiling water upon the coffee and allowing it to percolate through.

Other forms of cooking utensils embodying my invention will readily suggest themselves from the foregoing specification:—my invention relating to the means for adjustably supporting an inner vessel in an annular supporting plate or outer receptacle.

Whether in the form of ribs as illustrated in Figs. 1 and 2 or grooves as illustrated in Figs. 3 and 4, the spirals on the inner vessel coöperating with counterpart notches or projections, as the case may be, on the margin of the annular plate 5 form shoulders to guide the inner vessel in its vertical adjustment and automatically support it wherever set.

In like manner the recesses in the inner margin of the annular top of the outer receptacle may be narrow notches to receive the external spiral ribs on the inner vessel as illustrated in Figs. 1 and 2 or they may be wide recesses intervening between the projections which engage the spiral grooves on the outside of the inner vessel as illustrated in Figs. 3 and 4.

Having thus described my invention, the following is what I claim as new therein, and desire to secure by Letters Patent:

1. In a cooking or culinary utensil the combination of a containing vessel provided on its outside with oblique or spirally arranged shoulders, and an annular supporting plate having a recessed inner margin coöperating with the shoulders on the containing vessel to effect the raising or lowering of said vessel by rotary motion imparted thereto and sustain it at any height to which it may be adjusted.

2. In a cooking or culinary utensil, the combination of an outer receptacle formed with a notched or recessed mouth or opening and an inner vessel provided on its outside with spirally arranged shoulders coöperating with the notches or recesses in the mouth of the outer receptacle so as to guide the inner vessel in its vertical movement and support it in any position in which it may be set.

3. In a cooking or culinary utensil the combination of an outer receptacle formed with a recessed annular top and an inner vessel adjustably supported in said recessed annular top by means of upwardly extended and obliquely arranged shoulders on the exterior of the inner vessel.

4. In a cooking or culinary utensil the combination of an outer receptacle formed with a recessed annular top and an inner vessel provided on its outer surface with spiral or oblique shoulders coöperating with the recessed annular top of the outer receptacle, to effect the vertical movement of the inner vessel by rotary movement imparted to the latter, and to sustain it at any height to which it may be set.

LEROY J. ELLIS.

Witnesses:
WM. E. KNIGHT,
JOSEPH J. SCHMIDT.